United States Patent [19]

Johnson

[11] Patent Number: 4,981,407
[45] Date of Patent: Jan. 1, 1991

[54] BALE LOADER, TRANSPORTER AND FEEDER

[76] Inventor: Jerry Johnson, Rte. 1, Box 517, Devils Lake, N. Dak. 58301

[21] Appl. No.: 389,055

[22] Filed: Aug. 2, 1989

[51] Int. Cl.$^5$ .............. A01D 90/00; A01D 5/00; A01D 1/16

[52] U.S. Cl. .................. 414/24.5; 119/60; 414/554; 414/557; 414/911

[58] Field of Search ............. 119/60; 414/24.5, 24.6, 414/551, 554, 556, 557, 911, 426, 428, 458; 254/8 R

[56] References Cited

U.S. PATENT DOCUMENTS

| | | | |
|---|---|---|---|
| 3,949,706 | 4/1976 | Coon, Jr. ............... | 119/60 |
| 3,974,926 | 8/1976 | Kopaska . | |
| 4,037,741 | 7/1977 | Smith . | |
| 4,067,298 | 1/1978 | Jones et al. ............ | 119/60 |
| 4,182,590 | 1/1980 | Harkness ............... | 414/24.5 |
| 4,237,821 | 12/1980 | Haines ................... | 119/60 |
| 4,253,786 | 3/1981 | Harkness ............... | 414/24.5 |
| 4,326,827 | 4/1982 | McNutt .................. | 414/24.5 |
| 4,330,231 | 5/1982 | Brewer .................. | 414/24.5 |
| 4,348,143 | 9/1982 | Hedgespeth ........... | 414/24.5 |
| 4,448,361 | 5/1984 | Marcy ................... | 414/24.6 X |
| 4,527,935 | 7/1985 | Fortenberry ........... | 414/24.5 |

Primary Examiner—Robert P. Olszewski
Assistant Examiner—Janice Krizek
Attorney, Agent, or Firm—Kinney & Lange

[57] ABSTRACT

A bale transporter and feeder is used for loading, transporting and feeding large bales of hay. This transporter and feeder includes a frame which is adapted to be connected to a prime mover and which forms a horizontal support bed, which will at least partially support a hay bale on end during transport and feeding. A lift is pivotally supported on the frame and rotatable substantially 90° about a horizontal axis at approximately the same height as the horizontal support bed. This lift is adapted to engage a hay bale on the ground in a lowered position and is rotatable to a raised position. In the raised position the bale is supported on end of the support bed and the lift, and can be left in place for feeding cattle after the frame has been moved to a feeding area. An actuator is supported on the frame to move the lift between the lowered and raised positions.

9 Claims, 2 Drawing Sheets

BALE LOADER, TRANSPORTER AND FEEDER

BACKGROUND OF THE INVENTION

1. Field of the Invention

The present invention relates to the handling of hay, and more particularly, to an apparatus which loads and transports large cylindrical bales of hay and also serves as a feeding rack.

2. Description of the Prior Art

Various types of hay bale loaders and transporters have been advanced over the years Some of these devices also serve as feeders, but no single apparatus lifts a large cylindrical hay bale, securely supports it during transport to a feeding location, and remains in the feeding location to securely support the hay bale during feeding U.S Pat. No. 4,527,935 shows a loader and transporter that uses a winch and cable to move a lift which raises a cylindrical hay bale off the ground and rotates it onto an end. This lift is transferrable between a trailer towed by a pick-up truck and a pick-up bed. When mounted on the pick-up bed, the bale obviously must be unloaded onto some type of feeding rack. When mounted on the trailer, there are insufficient upwardly extending supports for retaining the hay bale during transport and feeding U.S. Pat. No. 4,348,143 shows another loader and transporter that utilizes a winch and cable to move a lift which raises a cylindrical hay bale off the ground and rotates it enough to provide clearance for transport. This apparatus does not have sufficient supports to retain the bale during feeding.

U.S. Pat. No. 4,326,827 discloses a loader and transporter that engages the side of a cylindrical hay bale so that it can be rolled onto the loader. This apparatus is difficult to use, especially when the bale is frozen to the ground. It is not designed to be a feeder.

U.S. Pat. Nos. 4,253,786 and 4,182,590 show a complex loader and transporter for hauling a plurality of bales of hay. A plurality of fluid pressure actuators move a plurality of lifts to pick up a cylindrical hay bale from its side and successively move it to the front of the apparatus. These units are loaders and transporters only.

U.S. Pat. No. 4,067,298 illustrates a hay hauler and feeder apparatus that has sufficient supports for retaining the hay during feeding to minimize waste, but this apparatus does not load the hay bales.

U.S. Pat. No. 4,037,741 shows a bale loading, transporting, and feeding apparatus that uses a fluid pressure actuator to move a lift which rotates a cylindrical hay bale from a horizontal position on the ground to a substantially vertical position This apparatus is difficult to use since prongs must actually penetrate and poke through the bale rather than lifting it from underneath. Also, the end of the hay bale does not rest on anything secure in its raised position and the support would be unlikely to withstand self feeding of cattle without substantial loss of hay.

U.S. Pat. No. 3,974,926 discloses a bale loader and transporter that utilizes a fluid pressure actuator to move a lift which raises a hay bale off the ground. The forks that engage the bale are spaced so that they must be forced under a hay bale standing on its end. In addition to making loading difficult by having to force the forks under the bale, most cylindrical hay bales lie on their side rather than on their end in the field The apparatus in U.S. Pat. No. 3,949,706 uses a fluid pressure actuator to move a lift which rotates a cylindrical hay bale lying on its side to a raised position. This loader has a feeding fence around it and the lift operates inside the fence. The fence is spaced away from the bale, which is lowered onto the ground for feeding. As the bale is eaten the large fence will make it necessay to move the remaining hay out toward the fence because it will become unreachable by the cattle This causes inefficiencies in labor and waste of hay.

None of these patents disclose a simple, durable apparatus that provides a sturdy horizontal support for a hay bale on an end during transport and feeding in combination with sufficient upwardly extending supports to retain the hay bale during transport and feeding.

SUMMARY OF THE INVENTION

The present invention is an apparatus for loading and transporting cylindrical objects, such as large bales of hay. A frame is movable over the ground and includes horizontal support means adapted to at least partially support a hay bale during transport and feeding. The frame can be a separate unit having wheels and a tongue so that it can be &owed by transport means, or it can be attached to the transport means itself such as to the bed of a pick-up truck. A lift is pivotally supported on the frame and rotates substantially 90° about a horizontal axis which is approximately the same height as the horizontal support means The lift places such a hay bale at least partially on the horizontal support means by engaging the hay bale on the ground in a lowered position and rotating to a raised position In the form shown, a plurality of bars with rectangular cross-sections are welded together to form a framework for the lift and for the horizontal support means. Finally, power means supported on the frame moves the lift between the lowered and raised positions. A fluid pressure actuator can be used to perform this function.

A simple, low cost, reliable, and durable loader, transporter and feeder is thus provided

BRIEF DESCRIPTION (;F THE DRAWINGS

Figure 1:
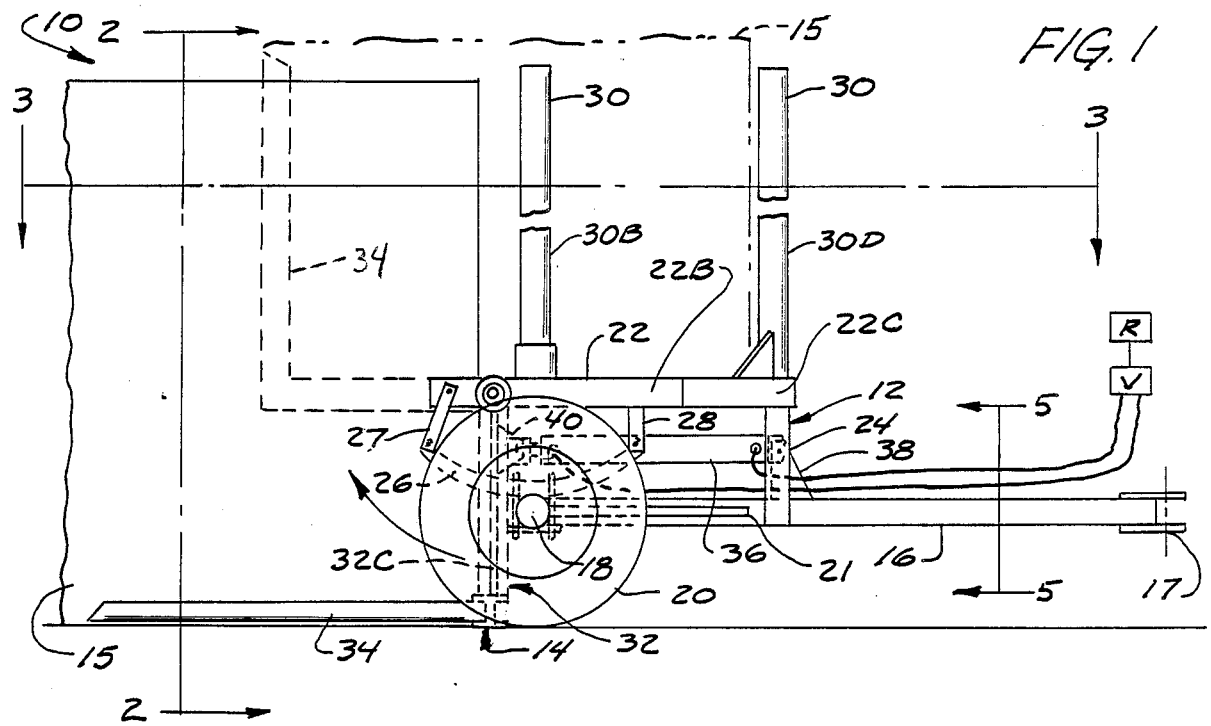
FIG. 1 is a side view of the bale transporter and feeder showing the lift in a lowered position and in dotted lines in a raised position.
Figure 4:
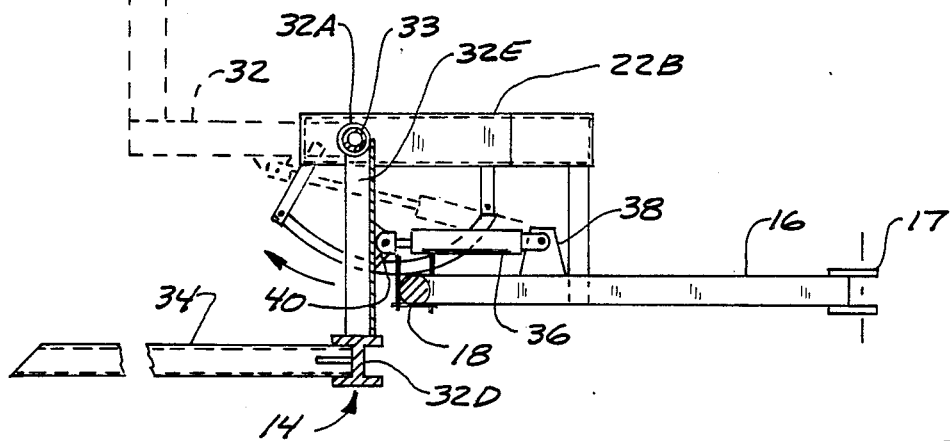
Figure 5:
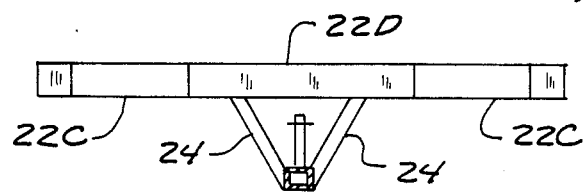

FIG. 4 is a partial side view of the bale transporter and feeder showing a fluid pressure actuator in a compressed position and in an extended position in dotted lines, and also showing the lift in a corresponding lowered position and raised position in dotted lines; and FIG. 5 is a fragmentary cross-sectional view of the bale transporter and feeder taken along line 5—5 in FIG. 1 showing spacer bars which connect the tongue to the horizontal support means.

DESCRIPTION OF THE PREFERRED EMBODIMENTS

Figure 3:
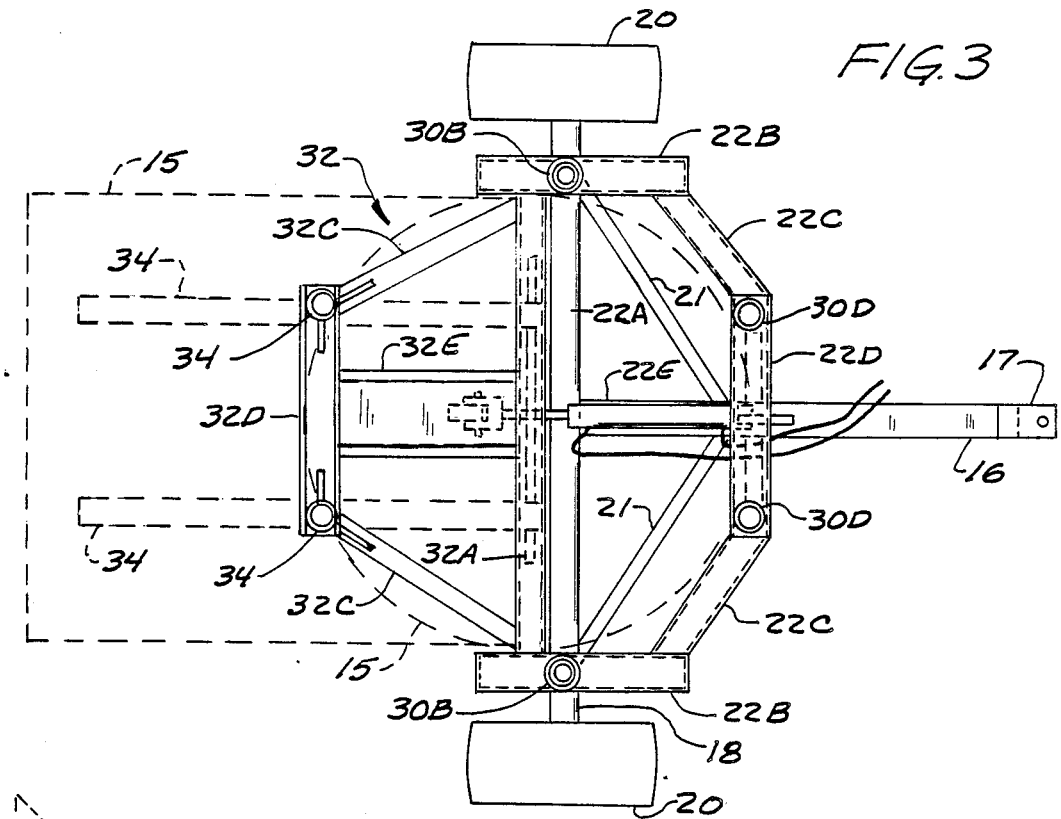
FIG. 3 is a top view of the bale transporter and feeder showing the lift in a raised position and in dotted lines in a lowered position.

A hay bale transporter and feeder indicated generally at 10 includes a frame 12 and a lift 14 and is made to lift, rotate and support a large cylindrical hay bale 15 for transport to a feeding location where it is then readily accessible to cat&le for feeding directly from the transporter and feeder 10. The large hay bales commonly are generally cylindrical, and when made by a baler will be dropped to lie on the ground on their sides. When one is to be lifted and transported it is engaged by the lift 14 longitudinally from an end. However, other bale shapes could be loaded and transported with the present invention The frame 12 includes a forwardly extending tongue 16. A forward end of the tongue 16 is provided with a pair of spaced-apart plates 17 connected to the top and bottom of tongue 16, each plate having an aperture therein for receiving a pin to connect the apparatus to the hitch of a towing vehicle such as a tractor, pick-up truck or jeep (not shown) Any conventional hitch arrangement can be used which allows the bale transporter and feeder to be towed by transport means. An aft end of the tongue 16 is connected to substantially the center of an axle 18 so that the tongue 16 is perpendicular to the axle 18. Wheels 20 are rotatably attached to the ends of axle 18 and bars 21, as shown in FIG. 3, are connected at first ends to axle 18 adjacent the respective wheels 20 and at their other ends to the sides of tongue 16 to provide support for lateral deflection. It should be noted that any type of trailer which can be towed by transport means and is adaptable to the other portions of the present invention can be used.

The frame 12 also has a plurality of spaced-apart horizontal support bars 22A–E connected to form a subframe assembly 22 which in plan view approximates the shape of a first half of the periphery of an end of a cylindrical hay bale. These bars preferably have rectangular cross-sections and are welded together As shown in FIG. 3, the assembly 22 includes a center bar 22A, side bars 22B, connector bars 22C, a front bar 22D, and a cross bar 22E. Center bar 22A is spaced above and is parallel to axle 18, and is substantially the same length as the diameter of an end of a cylindrical hay bale. The ends of center bar 22A are connected to the inner sides of side bars 22B at substantially the center of the length of 22B so that side bars 22B are parallel to each other and perpendicular to the center bar 22A. Connector bars 22C are connected at one end to the inner sides of side bars 22B forward of where the center bar 22A is connected and extend at an angle forward and inward toward the tongue 16. The other ends of connector bars 22C are connected to the inner side and toward the ends of front bar 22D, which is shorter than and parallel to center bar 22A. Cross-bar 22E is perpendicular to center bar 22A and front bar 22D, and is connected at each end to substantially the center of the inner sides of bars 22A and 22D. The resulting assembly partially supports a cylindrical hay bale on its end.

Referring to FIG. 5 and again to FIG. 1, the assembly 22 is spaced above the tongue 16 and is supported at a forward end by spacer bars 24 which are connected at one end to the underside and toward the ends of front bar 22D and at the o&:her end to the sides of tongue 16. Assembly 22 is connected to leaf springs 26, with spring hangers 27 and 28 which are connected to the outer side bars 22B in a suitable manner. Leaf springs 26 are supported by the axle 18 approximately at the center of the springs 26 Leaf springs are desirable to absorb the loads resulting from traversing rough terrain, but the assembly 22 can be supported on the tongue 16 and axle 18 in any practical manner.

Figure 2:
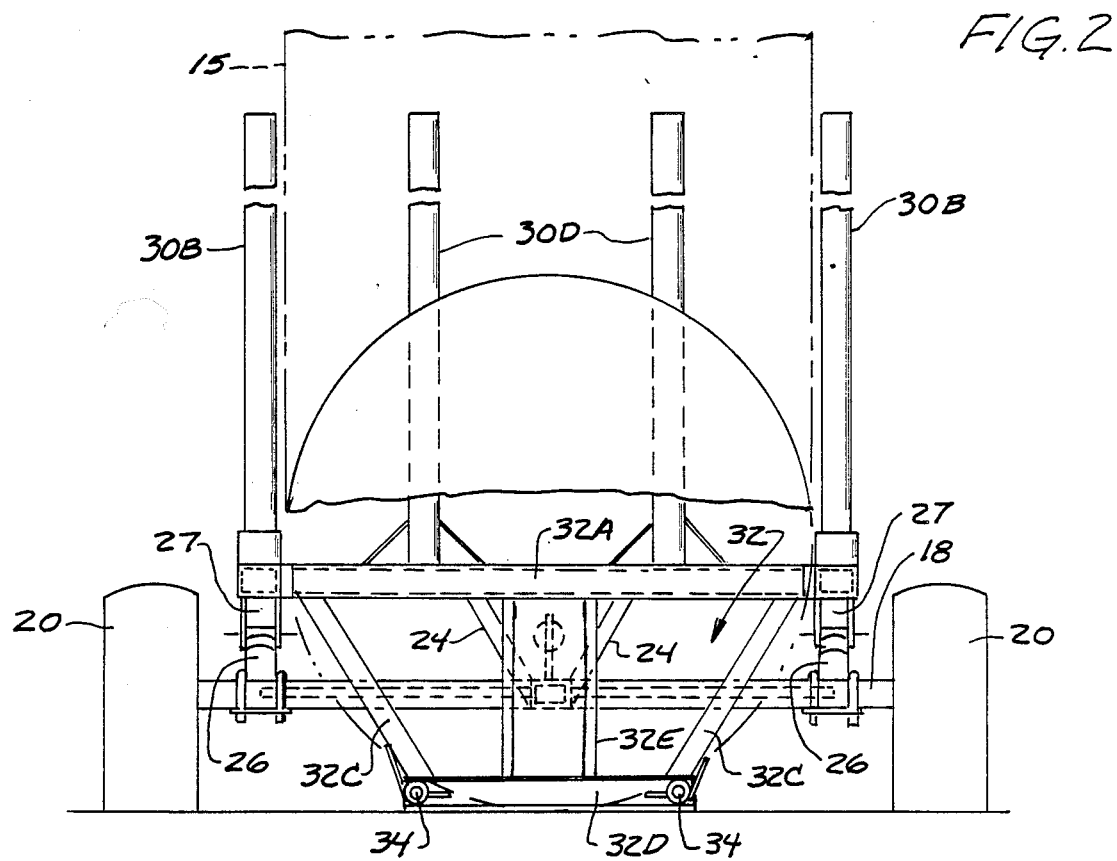
FIG. 2 is a rear view of the bale transporter and feeder showing the lift in a lowered position.

In addition, a plurality of vertical bale support bars or posts 30 extend upwardly from the assembly 22. As shown in FIG. 3, bars or posts 30B are connected to the tops of side bars 22B approximately at the intersection of center bar 22A and side bars 22B. Bars 30D are connected to the tops of front bar 22D toward the ends of front bar 22D. The exact location and number of these bars is not critical as long as they define the general shape of a cylindrical hay bale, and are positioned so they will encompass and retain a bale 15 supported on end on the subframe assmbly 22 during transit and feeding The bars or posts 30 are spaced far enough apart to allow cattle access for feeding The lift 14 is similar to a fork lift fork and has a back frame assembly 32 comprising a plurality of spaced-apart bars 32A, C, D, and E connected together to form the assembly 32. Back frame assembly 32 has a plan view shape which approximates a second half of the periphery of an end of a cylindrical hay bale. As shown in FIG. 2, assembly 32 includes a support pivot tube 32A which has connector bars 32C, a rear bar 32D and a cross bar 32E fixed thereto The crossbar 32E is supported on the pivot tube 32 by connector bars 32C, which also can be tubular members The pivot tube 32A is mounted over a support tube or shaft 33 which is fixed to and extends between side bars 22B of the subframe assembly 22 in position parallel to and adjacent center bar 22A. Connector bars 32C are connected at one end to the outer end portions of the pivot tube 32A and extend rearwardly and inwardly. The other ends of connector bars 32C are connected to the inner sides of rear bar 32D, which is parallel to pivot tube 32A. Cross bar 32E is perpendicular to pivot tube 32A and rigidly connected to the pivot tube 32A at one end and is connected at its outer end to the center of the bar 32D. The pivot tube can rotate on the support tube or shaft 33 between lowered and raised or transport positions.

Lift 14 also includes bars or tines 34 which are attached perpendicularly to the rear bar 32D adjacent to the ends of rear bar 32D. The tines are thus also perpendicular to the plane of the backframe assembly 32. When the backframe assembly 32 and the attached tines are in a raised position, the tines 34 act as vertical support posts, along with vertical support bars or posts 30 to retain a hay bale on end and permit access for feeding. When the backframe assembly is rotated about support tube 33 to a lowered position, the tines 34 are adjacent to or resting on the ground and are spaced apart so that they can engage the underside of a hay bale from its end.

Preferably, tines 34 have a bevel end cut to facilitate engagement with the hay bale. Rear bar 32D is an I-beam to better support the tines 34. Suitable means for supporting the base of the vertical support bars 30 and forks 34, such as triangular gussets, are also provided.

The present invention includes a fluid pressure actuator 36 which is connected at one end to an ear 38 that is connected to and extends upwardly from tongue 16. The end of the extendable and retractable rod of actuator 36 is connected to an ear 40, which is connected to and extends inwardly from cross bar 32E. FIG. 4 shows actuator 36 in a retracted position and in an extended position in dotted lines. Lift 14 is shown in a corresponding lowered position, and in a raised position in dotted lines.

In operation, the bale transporter and feeder is backed into alignment with one end of the hay bale 15 which is to be loaded The lift 14 is moved to a lowered position with the tines 34 adjacent to or on the ground.

The bale transporter and feeder is backed further until the tines 34 are under the bale and on opposite sides of the bale. The fluid pressure actuator 36 is then extended to rotate the lift 14 in a generally upward direction until the end portion of the hay bale which extends above the backframe is above assembly 22 and is supported thereon while the other portion of the end of the bale remains supported by backframe assembly 32. The bale is supported on its end in an upright position The apparatus supporting and retaining the hay bale is then transported to the feed lot, unhooked from the transport means, and left in the feed lot where it is accessible to the animals for self feeding.

The tines 34 are upright and they, together with the upright bars 30 prevent the bale from tipping over and yet are spaced sufficiently to permit cattle to feed readily. After the bale has been consumed by the cattle the transporter and feeder assembly can be moved to the hay field and used for transporting another bale for feeding The power operation of lift 14 makes loading easy and quick and because the frame 12 is mobile and easily moved no special bale carrier is needed. Once at the feed lot or area all that has to be done is to unhook the frame from the truck or tractor pulling it and the feeding chore is done. The bale does not have to be unloaded so no special equipment is needed then either. A suitable jack stand can be used for supporting the tongue during the time the cattle are feeding.

The fluid pressure actuator can be operated through use of a hydraulic pump on the tractor or pickup used for towing or a self contained, hand pump or electric pump can be used. A suitable valve is used as schematically illustrated.

Two lifts can be placed side by side on a common frame for double loading, transport and feeding, if desired.

The description above has dealt with the desirability of the present device for handling and feeding bales of hay. However, it can be used for lifting and transporting cylindrical tanks in the same manner. If the tanks are resting on their sides they can be lifted and held on end for transport, or for use, for example as a tank carrier for a field sprayer.

Although the present invention has been described with reference to preferred embodiments, workers skilled in the art will recognize that changes may be made in form and detail without departing from the spirit and scope of the invention.

What is claimed is:

1. An apparatus for loading, transporting, and feeding large cylindrical bales of hay having longitudinal length and opposite ends comprising:
   a frame adapted to be connected to transport means for movement from one location to another and having horizontal support means adapted to directly support an end portion of a cylindrical hay bale with the longitudinal length extending upwardly during transit and feeding and being at a vertical height to permit livestock to reach material on the horizontal support means;
   a plurality of spaced-apart upwardly extending posts secured to the horizontal support means and adapted to retain a cylindrical hay bale on an end and permit direct access for feeding by livestock;
   a lift having a pivot support pivotally hinged to the frame and rotatable substantially 90° about a horizontal axis which is substantially the same vertical height above a support surface as the horizontal support means, and a rearwardly facing L-shaped fork, having a first portion secured to the pivot support, and a pair of spaced tines substantially perpendicular to and supported by the first portion and spaced from the pivot support, the tines being adjacent to the ground when the lift is in a lowered position to engage an underside of a cylindrical hay bale when the tines are moved under a bale from an end; and
   power means having one end attached to the frame and the other end attached to the lift below the axis of pivot for moving the lift to raise a cylindrical hay bale engaged by the tines from a horizontal position on the ground and rotate it 90° to an upright position so that one end of the hay bale rests at least partially on the horizontal support means.

2. The apparatus of claim 1 wherein the power means comprises a fluid pressure actuator.

3. The apparatus of claim 1 wherein the horizontal support means further comprises a plurality of spaced-apart bars connected together as an assembly.

4. The apparatus of claim 3 wherein the horizontal support bars are assembled such that they approximate the shape of the periphery of one half an end of a cylindrical hay bale, including a first bar which is located substantially at a center line of the hay bale end, and at least a second bar which spans across an interior of the framework formed by the assembly.

5. The apparatus of claim 4 wherein the power means comprises a fluid pressure actuator.

6. An apparatus for loading, transporting, and feeding large cylindrical bales of hay comprising:
   a frame having a forwardly extending tongue adapted to be connected to transport means, and having a plurality of spaced-apart horizontal support bars connected to form a first assembly which approximates the shape of the periphery of a fist half of an end of a cylindrical hay bale, including a first bar which is connected so as to close the first assembly, and at least a second bar which is connected to and spans across the interior of the first assembly, wherein the support bars are adapted to support approximately one half a cylindrical hay bale on an end during transit and feeding;
   wheel means rotatably attached to the frame along a substantially horizontal axis perpendicular to the tongue and spaced below the horizontal support bars for allowing the apparatus to be towed by transport means;
   a plurality of spaced-apart upwardly extending posts secured to the horizontal support bars and adapted to retain a cylindrical hay bale on an end and permit access for feeding;
   a lift having a plurality of bars connected to form a second assembly which approximates the periphery of a second half of an end of a cylindrical hay bale, including a first bar which is pivotally hinged to the frame and rotatable substantially 90° about a horizontal axis adjacent the horizontal support bar that closes the first assembly, and at least a second bar which is connected to and spans across the interior of the second assembly, the lift also having two tines connected perpendicularly to the second assembly, wherein the tines engage an underside of a cylindrical hay bale from an end approach when the lift is in a lowered position and act as vertical supports when the lift is in a raised position, and wherein the second assembly combines with the first assembly to approximate the shape of the entire periphery of an end of a hay bale when the lift is in a raised position, thus acting as a horizontal support for a cylindrical hay bale resting on an end; and power means having one end attached to the frame and the other end attached to the lift below the axis of rotation for moving the lift to raise a cylindrical hay bale from a horizontal position on the ground and to rotate it 90° to an upright position so that one end of the hay bale rests on both of the first and second support bar assemblies.

7. An apparatus for loading and transporting cylindrical objects having a longitudinal length and ends comprising:

a frame adapted to be connected to transport means and including horizontal support means adapted to at least partially support a cylindrical object during transport, the support means comprising a bar assembly having a plurality of bars that define a support region that approximates the shape of one half of an end of the cylindrical object, said support means including a bar substantially at a diametral line of an end of the cylindrical object;

a lift pivotally supported on the frame and rotatable substantially 90° about a horizontal axis which is substantially the same height above a supporting surface as the horizontal support means, wherein the lift has a pair of tines adapted to engage a cylindrical object on the ground in a lowered position and is rotatable to a raised position, placing such a cylindrical object at least partially on the horizontal support means with the tines extending vertically to tend to support the cylindrical object; and power means supported on the frame for moving the lift between the lowered and raised positions and holding it in raised position during transport for supporting the cylindrical object.

8. The apparatus of claim 7 wherein at least one bar spans across an interior of the framework formed by the assembly.

9. The apparatus of claim 7 wherein the cylindrical object is a large cylindrical hay bale, and wherein the frame includes a vertically extending plurality of spaced-apart bars connected to and extending upwardly from the horizontal support means to prevent tipping of a hay bale supported on the frame and to allow access for feeding.

* * * * *

UNITED STATES PATENT AND TRADEMARK OFFICE
CERTIFICATE OF CORRECTION

PATENT NO. : 4,981,407

DATED : January 1, 1991

INVENTOR(S) : Jerry Johnson

It is certified that error appears in the above-identified patent and that said Letters Patent is hereby corrected as shown below:

Col. 6, line 37, delete "fist", insert --first--.

Signed and Sealed this

Twenty-first Day of July, 1992

Attest:

DOUGLAS B. COMER

Attesting Officer

Acting Commissioner of Patents and Trademarks